United States Patent Office 3,579,461
Patented May 18, 1971

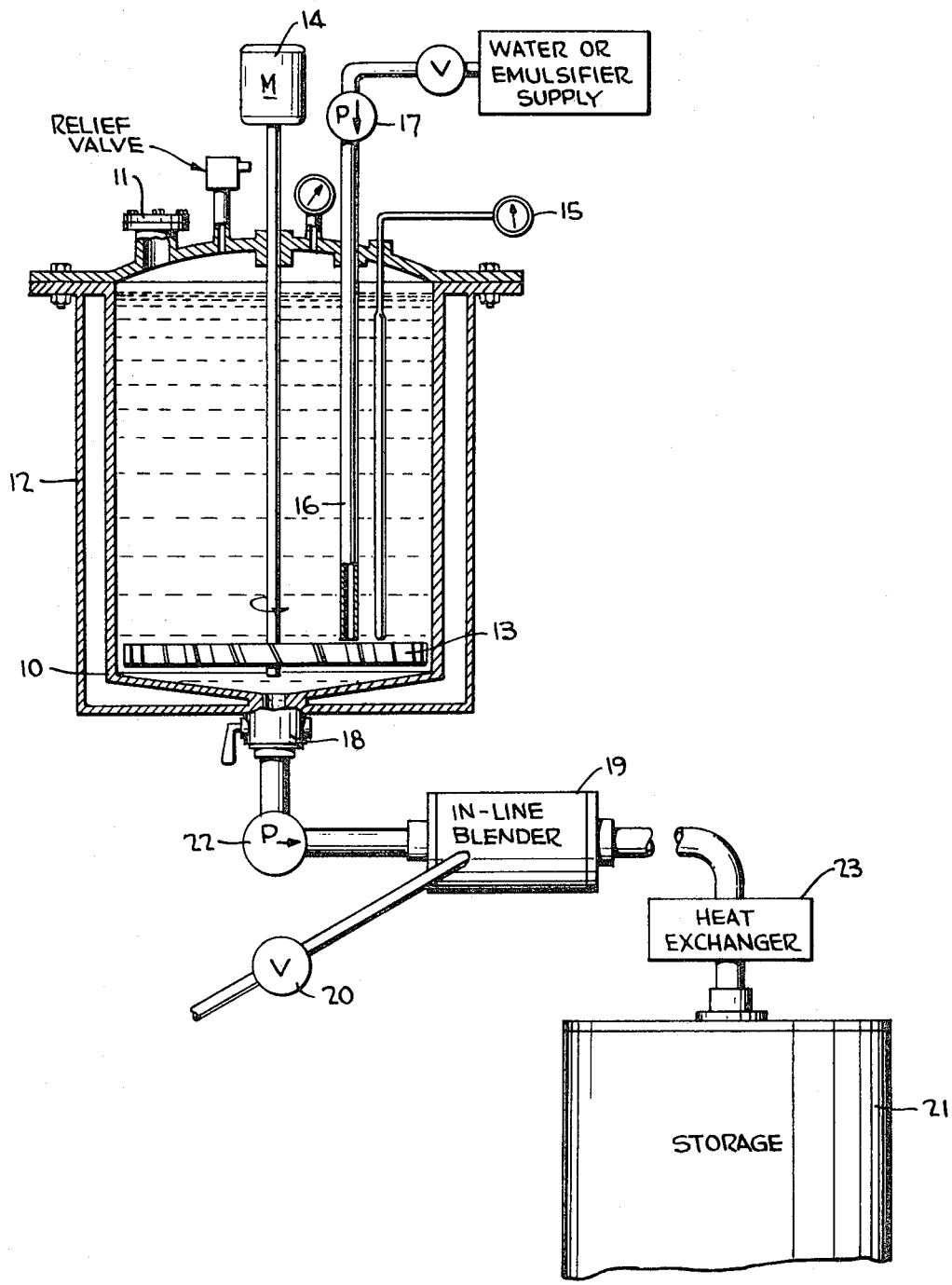

3,579,461
EMULSIFICATION PROCESS
Wayne R. Glaub, Racine, Wis., assignor to S. C. Johnson & Son, Inc., Racine, Wis.
Filed Nov. 20, 1967, Ser. No. 684,436
Int. Cl. B01j 13/00
U.S. Cl. 252—311                         9 Claims

ABSTRACT OF THE DISCLOSURE

An improved process for manufacturing a wax emulsion under pressure is described According to the process, the wax and a minor amount of the total water used in the emulsion are added to the pressure vessel and heated under pressure. An emulsifier is added, preferably beneath the surface of the wax/water concentrate, with agitation to obtain uniformity and provide a water-in-wax emulsion. The emulsion is diluted rapidly with sufficient water being added beneath the surface to obtain a wax-in-water emulsion.

FIELD OF INVENTION AND PRIOR ART

This invention is directed to an improved method of manufacturing wax emulsions. More particularly, the invention is directed to the manufacture of wax emulsions under pressure providing an emulsion having improved properties such as small and uniform particle size, light color, and good stability.

Various methods have been suggested for the manufacture of wax emulsions. Normally these methods are carried out at atmospheric pressure and essentially comprise either the steps of melting the wax to be dispersed, adding an emulsifying agent thereto, and thereafter adding hot water directly to the wax and emulsifying agent while stirring or the steps of melting the wax to be dispersed and thereafter adding the melted wax to hot water containing the emulsifying agents. Numerous modifications are possible in the aforesaid procedures.

Although the described processes have been used extensively for preparing commercial wax emulsions, they have inherent disadvantages. For example, the temperature at which atmospheric processes can be carried out are limited to the boiling point of water. High melting waxes such as synthetic polyethylene wax compositions are difficult to emulsify at the boiling point of water regardless of the technique employed. When the molten wax is added to boiling water the wax has a tendency to solidify and/or vaporize the water and any volatile emulsifiers present. On the other hand, if the boiling water is added to the molten wax, the water and volatile emulsifier will again volatilize. The loss of volatile emulsifier not only increases the cost of the emulsion but the loss of the water and emulsifier will change the concentration of the emulsion resulting in poor emulsions. Furthermore, again particularly with the high melting synthetic waxes, the melting of the wax at atmospheric pressure is slow with some polymerization of the waxes occurring providing a wax emulsion which is comparatively dark in color having modified and uncontrolled characteristics.

Although the manufacture of wax emulsions under pressure has been suggested, such methods are not completely practical primarily as a result of an inability to control the size and uniformity of the particles and the concentration of the emulsions obtained. Furthermore, pressure vessels having the required capacity for a commercial operation are expensive.

OBJECTS AND GENERAL DESCRIPTION OF THE INVENTION

Accordingly, it is an object of the present invention to provide an improved and commercially practical process for making emulsions under pressure.

It is another object of the present invention to provide an improved pressure emulsification process comprising forming an emulsion having a high wax concentration in a pressure vessel and diluting the emulsion by in-line blending.

It is another object of the present invention to provide a new and improved wax-in-water emulsion.

It is a further object of the present invention to provide a new and improved wax-in-water emulsion having small, average particle size, exceptional uniformity of particle size, light color, and good stability.

These and other objects of the present invention will be more readily apparent from the following detailed description with particular emphasis being placed on the illustrative examples and drawing.

The objects of the present invention are accomplished by manufacturing wax emulsions under pressure in a pressure vessel. More specifically, according to the present invention the wax and part of the water of the emulsion are charged to a pressure vessel. Optionally, the non-volatile emulsifiers and other raw materials of the emulsion can be added at this time. The amount of water employed in the initial charge is critical. Sufficient water must be present to form a water-in-wax concentrate. Too much water, however, will form a wax-in-water concentrate which when diluted after completion of the initial processing will result in a milky emulsion, i.e., an emulsion having large particle size and poor stability. The amount of water added initially can vary from about 5 to 15 percent of the total water to be employed in the emulsion, with the preferred amount depending upon the waxes used and the characteristics desired for the final wax dispersion. The water and wax and, if desired, other materials are heated with agitation until all of the wax has melted and a uniform mixture is obtained. The temperature at which the heating is carried out will vary depending primarily upon the wax employed but is generally in the range of from 10 to 15 degrees above the melting point of the highest melting wax in the composition. Agitation while not completely essential increases the rate of heat transfer, shortens the melting time significantly, and prevents discoloration.

After a uniform admixture of the ingredients is obtained, an emulsifier is added under pressure preferably beneath the surface of the mixture in the pressure vessel. It is desirable to add the emulsifier beneath the surface to prevent excessive vaporization of any volatile emulsifier and to promote even distribution. A water-in-wax emulsion concentrate having a non-volatile content of from about 63 to 75 percent forms immediately. Agitation is necessary to ensure uniformity. However, the duration of further heating should be held to a minimum to avoid darkening of the wax emulsion.

The reaction charge which consists of a high solids water-in-wax emulsion concentrate is then diluted with hot water to form the final emulsion. The water employed in the dilution must have a temperature of at least 150° F. to obtain an emulsion having small and uniform particles without throw out. Water at a temperature of from about 170 to 180° F. is preferred. Moreover, the dilution with water to form the final emulsion can be carried out entirely in the pressure vessel. However, the number of gallons made per batch in a vessel of a given capacity can be increased substantially by diluting the wax concentration outside the pressure vessel, as for example by using an in-line blender. The high viscosity of a high solids concentrate of the wax emulsion could cause difficulty in in-line dilution when going directly from a high solids to a low solids emulsion. Accordingly, it is preferable to employ a two-step dilution technique partially cutting the high concentrate emulsion within the pressure vessel and making a final dilution by means of an in-line blender. Employing this technique, the high solids concentrate which will normally be from 63 to 75 percent non-volatile is initially cut within the kettle to a concentrate capable of being pumped, i.e., an emulsion which is not excessively viscous. This has been found with most wax emulsions to be a concentrate having a non-volatile content of less than about 45 percent. The emulsion is thereafter diluted in an in-line blender to the desired concentration or it can be pumped directly to a storage unit and the concentration of the emulsion adjusted to the desired level prior to use. As is apparent, the size of the pressure vessel needed for making a given amount of wax emulsion can be substantially reduced.

During the dilution the high solids emulsion concentrate inverts from a water-in-wax to wax-in-water system. In the event the dilution is carried out in two stages, i.e., initially within the pressure vessel with a final dilution by means of an in-line blender, the inversion will occur within the pressure vessel. The water used in the dilution must be dispersed quickly to obtain an emulsion having small and uniform particles. Accordingly, it is preferred that the water be added to the pressure vessel by means of a high capacity pump and at as rapid a rate as possible. The optimum would be to introduce all of the water at once. However, good emulsions are obtained provided the emulsion is cut from the high solids concentrate past the point of inversion of the emulsion in not more than about 1½ minutes. Moreover, in order to avoid excessive foaming and to manufacture emulsions of uniform character, it is necessary to introduce the water beneath the surface of the concentrate. If the water is introduced from the top of the pressure vessel at a rapid rate, excessive foaming will occur providing a poor emulsion.

The final dilution which can occur within the pressure vessel, in an in-line blinder, or in the storage tank is preferably carried out utilizing hot water. It is possible, however, to use ambient or cold water in the final dilution. Once the final dilution has taken place, quick cooling of the emulsion is desirable to prevent particle growth which will occur during slow cooling of the emulsion. Accordingly, by quick cooling, emulsions having improved clarity and stability are obtained.

The emulsions obtained are excellent for use in floor polishes comprising vinyl polymers or alkali solution resins where smallness and uniformity of particle size, stability as well as lightness of color are essential. Such polishes are described in U.S. Pats. Nos. 3,308,078 and 3,320,196.

In the presently described process, the waxes which can be used are those commonly employed in manufacturing wax emulsions. However, as is apparent from the hereinbefore description of the invention, the advantages of the process are most fully obtained when using the high melting synthetic waxes such as the polyethylene waxes. These waxes normally having a molecular weight in the range of from 1,000 to 8,000 and a ring and ball melting point (ASTM D36–26) above about 248° F. at atmospheric pressure are commercially available from several manufacturers including Eastman Chemical Products Inc., Union Carbide Corporation, and Allied Chemical. Additionally, the process can be effectively employed using the paraffin hydrocarbon waxes which are usually derived from petroleum sources, or ester-type waxes which are usually derived from animal or plant sources or produced synthetically, particularly those waxes difficult to handle as a result of high melting point, tendency to polymerize, and/or darken upon heating. Examples of suitable vegetable waxes are carnauba, Japan, bayberry, retamo, and candelilla. Exemplary synthetic ester-type waxes are the esters of polyhydric alcohols with suitable monocarboxylic acids such as the esters of glycerol or glycol with Montanic and stearic acids. An additional class of synthetic ester waxes are the high molecular weight synthetic esters derived by the esterification of suitable polycarboxylic acids and polyhydric alcohols terminated with waxy monocarboxylic acids or monohydric alcohols. The esters prepared from glycol and phthalic acid or from glycol and anhydrides of acids such as succinic and maleic and monocarboxylic acids and monohydric alcohols such as docosanoic acid or docosanoyl alcohol are typical examples. Other synthetic ester waxes are prepared from suitable polycarboxylic acids or their anhydrides and long chain monohydric alcohols exemplified by docosanyl phthalate. Additionally, it is possible to employ mixtures of waxes in manufacturing the emulsions. For example, excellent emulsions can be obtained by using a combination of one or more waxes such as polyethylene waxes, carnauba, oxidized and unoxidized micro-crystalline waxes, acid montan waxes, oxidized and unoxidized Fischer-Tropsch waxes, or the like.

In the present process various emulsifying agents can be employed including non-ionic emulsifiers and anionic emulsifiers or mixtures thereof. Exemplary emulsifiers are morpholine or diethylaminoethanol in combination with oleic acid or tall oil fatty acid. Other emulsifiers which can be employed are described in McCutcheon's "Detergents and Emulsifiers Annual," 1967. A guide to the proper selection of the emulsifiers is available from the Atlas Powder Company utilizing its HLB system which balances the hydrophilic and lipophilic character of the surfactant. Selecting the proper emulsifier depends upon the ultimate application of the emulsion and the properties desired in the emulsion. Since the proper selection of the emulsifier is within the ability of one skilled in the art, a more detailed discussion will not be set forth herein.

In addition to the essential ingredients of wax, emulsifiers and water, the wax emulsions made according to the present process can include preservatives such as minor amounts of formaldehyde and depending upon the use of the wax, dyes, flavors, scents, and the like. These materials normally will be added to the emulsion after the initial dilution of the emulsion, and preferably in the in-line blender or in the storage tank. However, if the materials are unaffected by heat, they can be added at any time during the processing of the emulsion.

In the manufacture of the emulsions, standard pressure equipment can be employed. Thus, the only requirement is that the pressure kettle be capable of withstanding the reaction pressures which normally will range from about 20 to 150 pounds at 400° F. depending upon the melting point of the wax being emulsified and the sudden pressure increase during dilution. The pressure vessel should be equipped with an agitator and a motor capable of operating the agitator satisfactorily at the viscosity of the wax emulsion. In addition to the above, the pressure kettle must be equipped with a device which will permit the rapid addition of water and emulsifier to the pressure vessel below the surface of the materials in the vessel. Accordingly, an auxiliary, high capacity pump capable of adding the emulsifier and water at a rapid rate is essential. In the event the wax emulsion is not to be diluted to its desired concentration within the pressure vessel or in the storage tank, an in-line blender is needed. Furthermore, it is necessary that the pressure vessel be equipped to permit heating during the emulsification. In the event the dilution is to be carried out completely within the pressure vessel, the vessel preferably is equipped with means for cooling the emulsion. Accordingly, it is preferred that the vessel be jacketed to permit either heating or cooling by selectively flowing steam or water through the jacket. The kettle should be equipped with a pressure gauge and thermocouple for reading the temperature of the emulsion. A heat exchanger is to be positioned between the pressure kettle and the storage unit to properly adjust the temperature of the emulsion for storage. In the event the final dilution occurs outside the pressure vessel, as for example in the in-line blender, a pump capable of pumping the high solids emulsion is to be positioned between the pressure vessel and in-line blender.

DRAWING AND PREFERRED EMBODIMENTS

Having described the invention in general terms, preferred embodiments will be described with reference to the drawing in which a system for manufacturing the emulsions under pressure is illustrated. In the drawing the pressure vessel is shown filled with emulsion, i.e., after dilution of the water-in-wax concentrate to form a wax-in-water system.

EXAMPLE 1

18.2 parts polyethylene wax having a ring and ball melting point of 212 to 221° F. and a molecular weight of 1750, 1.8 parts tall oil fatty acids and 6.4 parts water (8.3 percent of the total water of the emulsion) were charged to a 3,000 gallon pressure reactor 10 through filling port 11. After securing the filling port, heat was applied by means of heating jacket 12 with stirring of the reaction charge by means of agitator 13 driven by motor 14. The temperature was raised to about 250 to 255° F. determined by thermocouple and gauge 15. The temperature was maintained at the aforesaid temperature for approximately 15 minutes until all of the wax had been melted. 2.2 parts diethylaminoethanol emulsifier was then added under pressure through downpipe 16 by means of high capacity auxiliary pump 17. The diethylaminoethanol was added beneath the surface of the wax concentrate. The charge was heated for approximately 30 minutes with agitation while the temperature was adjusted to about 245 to 250° F. At the end of this heating period the charge was a water-in-wax emulsion. 15.8 parts water (20.4 percent of the total water of the emulsion) maintained at a temperature of from about 180 to 185° F. was added through downpipe 16 over a duration of less than 1.5 minutes. The water was added beneath the surface of the water-in-wax emulsion. There was an immediate inversion of the emulsion to a wax-in-water emulsion. The agitation was continued for a period of about five minutes to obtain a uniform emulsion. The temperature dropped to 220 to 230° F. during the addition of dilution water. Thereafter the concentrated water emulsion was pumped from the pressure vessel through valve 18 by means of pump 22 to an in-line blender 19. Water at approximately 170 to 190° F. was added through valve 20 at a rate sufficient to provide an emulsion having the desired concentration. The emulsion was pumped through heat exchanger 23 to storage unit 21. This reduced the temperature to a range of from about 80 to 100° F. Preferably a preservative such as a 37 percent aqueous solution of formaldehyde is added to the emulsion after the in-line dilution.

The emulsion obtained had small and uniform particle size, good color, and was stable. The emulsion is particularly well suited for blending self-polishing polymer-based floor polishes.

EXAMPLE 2

20.9 parts of polyethylene wax having a ring and ball melting point of approximately 290° F. and a molecular weight of 3,000, 4.1 parts oleic acid, and 10.0 parts of water (14.1 percent of the total water content of the emulsion) were charged to a stainless steel pressure vessel 10. The inlet port 11 was bolted down and the pressure vessel raised to a temperature of from about 290 to 320° F. by means of steam jacket 12. The charge was agitated by means of turbine agitator 13 driven by motor 14 which improves the heat transfer of the charge and reduces the initial heating period. After the reaction mixture is completely uniform, i.e., approximately 15 minutes of agitation and heating at 250° to 255° F., 4.1 parts morpholine were charged under pressure beneath the surface of the concentration through downpipe 16 by means of pump 17. The charge was heated for 30 minutes with agitation at a temperature of from about 290° to 320° F. Thereafter, 60.9 parts of water (85.9 percent of the total water of the emulsion) maintained at a temperature of 190° to 200° F. were charged to the reaction vessel beneath the surface of the wax concentrate in a maximum of 1½ minutes through downpipe 16 and auxiliary pump 17. The wax concentrate was agitated for an additional five minutes to obtain a uniform emulsion. Thereafter, the emulsion was pumped by pump 22 from the pressure vessel through valve 18, through a heat exchanger to lower the temperature from 80° to 100° F. and into storage unit 21. The solids content of the emulsion was adjusted to the desired level prior to use.

The emulsion was light in color, had small and uniform particles and had a high degree of stability. The emulsion was employed in a self-polishing floor wax utilizing an alkali soluble resin.

As is apparent by utilizing the presently described process no charring, polymerization, or darkening of the waxes occurs during heating. Furthermore, since the system is completely closed, volatile components such as amine emulsifiers, are not lost reducing cost and providing more uniform emulsions. Additionally, the emulsifiers, as seen from the examples, can be formed in situ in the pressure vessel, with the non-volatile component optionally being added with the wax and the initial portion of water and the volatile emulsifiers or emulsifier component being added after the wax is melted. As used in the present specification and claims, the terms "emulsifier" and "an emulsifier" are used interchangeably to designate either the total emulsifier system, or a material such as an acid or amine used to make up the total emulsifier. The end emulsion products are clear, have small and uniform particles without throw out. As further apparent, various modifications can be made to the presently described process and still fall within the scope and spirit of the present invention. The essential steps are forming a water-in-wax emulsion under pressure and the initial dilution of the water-in-wax emulsion using water at a temperature of at least about 150° F. at a rate sufficient to obtain substantially immediate inversion of the emulsion to form a wax-in-water concentrate. Such modifications being within the ability of one skilled in the art are intended to be covered herein.

It is claimed:

1. An improved process for manufacturing wax emulsions under reaction pressures ranging from about 20 to 150 pounds at 400° F., said process comprising the sequential steps of (1) charging the wax and from 5 to 15 percent of the total water of the final wax emulsion to a pressure vessel; (2) heating, at a temperature in the range of from 10 to 15 degrees above the melting point of the highest melting wax in said charge and until all of the wax has melted, to obtain a uniform mixture; (3) adding an emulsifier under pressure to the mixture of 2 above; (4) continuing heating of said charge until a uniform water-in-wax emulsion is formed; and (5) adding sufficient water at a temperature of at least 150° F. under pressure beneath the surface of the water-in-wax emulsion of 4 above over a maximum duration of 1½ minutes to obtain a wax-in-water emulsion.

2. The process of claim 1 wherein the heating of steps 2 and 4 are acompanied by agitation.

3. The process of claim 1 wherein the emulsifier is added beneath the surface of the mixture.

4. The process of claim 1 wherein the percentage of water in step 1 is from 8 to 12 percent.

5. The process of claim 4 wherein the dilution of step 5 is accomplished in two steps, forming an intermediate and final wax emulsion concentrate, the intermediate emulsion being formed within the pressure vessel, and the final emulsion being formed by means of in-line blending, said intermediate emulsion having a higher viscosity than said final emulsion.

6. The process of claim 5 wherein the water to form the intermediate emulsion occurs in a maximum duration of one minute.

7. The process of claim 4 wherein the dilution of step 5 is accomplished in two steps, forming an intermediate and final wax concentrate, the initial emulsion being formed within the pressure vessel and the final emulsion being formed in a storage tank.

8. The process of claim 1 wherein the dilution water is maintained at a temperature of from 170 and 185° F.

9. The process of claim 1 wherein the final wax emulsion is cooled rapidly to a temperature of no more than 100° F.

References Cited

UNITED STATES PATENTS 3,340,204    9/1967    MacLeod et al. ____ 252—311.5

JOHN D. WELSH, Primary Examiner

U.S. Cl. X.R.

252—311.5; 106—271, 273